(12) United States Patent
Sueyoshi et al.

(10) Patent No.: US 6,931,371 B2
(45) Date of Patent: Aug. 16, 2005

(54) DIGITAL INTERFACE DEVICE

(75) Inventors: Masahiro Sueyoshi, Osaka (JP);
Takeshi Fujita, Osaka (JP); Kazutaka Abe, Osaka (JP); Kosuke Nishio, Osaka (JP); Takashi Katayama, Osaka (JP); Masaharu Matsumoto, Osaka (JP); Akihisa Kawamura, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 592 days.

(21) Appl. No.: 09/933,881

(22) Filed: Aug. 21, 2001

(65) Prior Publication Data

US 2002/0026255 A1 Feb. 28, 2002

(30) Foreign Application Priority Data

Aug. 25, 2000 (JP) .................................... 2000-255064

(51) Int. Cl.[7] ............................................. G10L 19/00
(52) U.S. Cl. ........................ 704/201; 704/219; 704/501
(58) Field of Search ................................ 704/201, 219, 704/501, 212, 229; 370/468; 381/23

(56) References Cited

U.S. PATENT DOCUMENTS

| | | | | |
|---|---|---|---|---|
| 5,247,396 A | * | 9/1993 | Nagai et al. .................. 360/8 |
| 5,826,227 A | * | 10/1998 | Jayant ........................ 704/229 |
| 5,953,375 A | * | 9/1999 | Nishiwaki et al. ........... 375/259 |
| 5,956,674 A | * | 9/1999 | Smyth et al. .............. 704/200.1 |
| 6,691,086 B2 | * | 2/2004 | Lokhoff et al. ............. 704/229 |
| 6,792,006 B1 | * | 9/2004 | Kumaki et al. ............. 370/537 |

FOREIGN PATENT DOCUMENTS

EP 0 668 697 8/1995

OTHER PUBLICATIONS

Chinese Office Action regarding Application No. 018012550.1 dated Dec. 19, 2003.
Indonesian Office Action regarding Application No. W00200200952 dated Apr. 30, 2004, with translation.
CD Editorial Group, "Final Text for DIS 11172–3 (rev. 2): Information Technology–Coding of Moving Pictures and Associated Audio for Digital Storage Media—Part 1—Coding at up to about 1.5 Mbit/s (ISO/IEC JTC 1/SC 29/WG 11 N 0156) 'MPEG 92!—Section 3: Audio Coded Representation of Audio, Picture Multimedia and Hypermedia Information. Apr. 20, 1992. ISO/IEC JTC 1/SC 29 N 147. Final Text for DIS 11172–1 (rev. 2): Information TechnologyCoding of Moving Pictures and Associated Audio for Digital Storage Media, 1992, pp. III–V, 174–337, XP002083108 p. 189, paragraphs 2.4.1.2,2.4.1.3,2.4.2.3".

* cited by examiner

Primary Examiner—David L. Ometz
Assistant Examiner—James S. Wozniak
(74) Attorney, Agent, or Firm—Renner, Otto, Boisselle & Sklar, LLP

(57) ABSTRACT

This invention relates to a signal transmission apparatus and a signal transmission method both for transmitting a plurality of pieces of encoded audio information having a plurality of sampling frequencies of F or 1/N×F, which are encoded by the same encoding method, via a digital interface to a signal reception apparatus.

10 Claims, 8 Drawing Sheets

DIGITAL INTERFACE DEVICE

BACKGROUND OF THE INVENTION

1. Field of the Invention

The present invention relates to a signal transmission apparatus and a signal transmission method both for transmitting encoded audio information. More specifically, the present invention relates to a signal transmission apparatus and a signal transmission method both for transmitting a plurality of pieces of encoded audio information having a plurality of sampling frequencies of F or 1/N×F, which are encoded by the same encoding method, via a digital interface to a signal reception apparatus.

2. Description of the Related Art

Encoded audio information is transmitted from a signal transmission apparatus via a digital interface to a signal reception apparatus.

FIG. 7 is a diagram for explaining a conventional audio data processing apparatus 700, The audio data processing apparatus 700 comprises a signal transmission apparatus 701 for transmitting a transmission signal 704 including encoded audio information, a signal reception apparatus 703 for receiving the transmission signal 704, and a digital interface 702 for mediating the transmission signal 704 between the signal transmission apparatus 701 and the signal reception apparatus 703. The signal reception apparatus 703 may, for example, be a device for reproducing the transmission signal 704.

ISO/IEC61937 is a known standard for transmission and reception of encoded audio information conducted using the digital interface 702. In this standard, the signal transmission apparatus 701 transmits the transmission signal 704 including encoded audio information obtained by encoding a PCM (Pulse Code Modulation) signal having M samples per frame, in the form of a 16-bit-and-M-sample stereo signal. In this case, when the size of burst information including management information and encoded audio information is less than a block size of 16×M×2 bits, the signal transmission apparatus 701 writes stuffing information in the unused portion of the block (stuffing process), and specifically sets the entire unused portion to zero, thereby generating the complete block.

Typically, in the transmission signal 704 transmitted from signal transmission apparatus 701, synchronization word information appears in each block. The time between the start of a block indicated by certain synchronization word information and the start of another block indicated by the immediately following synchronization word information is herein referred to as a "repetition time".

In the ISO/IEC61397 standard, it is assumed that a stream of MPEG2 audio having a low sampling frequency (LSF) [24 kHz, 22.05 kHz, or 16 kHz] is transmitted. In this case, the repetition time is twice as long as a repetition time when a stream of MPEG1 audio having a sampling frequency of 48 kHz, 44.1 kHz, or 32 kHz is transmitted.

A transmission clock of the digital interface 702 which is of a typical type as described in the ISO/IEC61397 standard is set, assuming that the sampling frequency of encoded audio information to be transmitted is 48 kHz, 44.1 kHz, or 32 kHz.

When different encoding methods are used to encode audio information as described above, the signal reception apparatus 703 needs to receive information about an encoding method in order for the signal reception apparatus 703 to correctly receive the transmission signal 704. In this standard, a value indicating that encoded audio information has been encoded by a different encoding method it defined in a bit field for data type information of the transmission signal 704 so as to notify the signal reception apparatus 703 that a different encoding method has been used.

In this case, as encoding methods for encoding audio information are changed, the repetition times of the transmission signal 704 are also changed. Therefore, if an encoding method which has been used to obtain encoded audio information is defined in data type information, the signal reception apparatus 703 can synchronize the transmission signal 704. Therefore, the signal reception apparatus 703 can appropriately process the transmission signal 704.

Now, it is assumed that encoded audio information, which has been obtained by the same encoding method but using a different sampling frequency, is transmitted via the digital interface 702 to the signal reception apparatus 703. The transmission clock of the digital interface 702 and the reception clock of the signal reception apparatus 703 are both constant. The digital interface 702 and the signal reception apparatus 703 are presumed to receive encoded audio information having a sampling frequency of 48 kHz.

Typically, the transmission clock of the digital interface 702 is equal to the reception clock of the signal reception apparatus 703. Therefore, in the following description, it is assumed that the transmission clock of the digital interface 702 is equal to the reception clock of the signal reception apparatus 703.

In the conventional art, the signal reception apparatus 703 cannot correctly receive encoded audio information having a sampling frequency other than an presumed sampling frequency unless the signal reception apparatus 703 is notified of a change in the repetition time of a transmission signal.

For example, when encoded audio information having a certain sampling frequency is transmitted and thereafter encoded audio information having a different sampling frequency is transmitted, the signal reception apparatus 703 cannot correctly receive the transmission signal 704 unless the signal reception apparatus 703 is notified of the change in the repetition time of the transmission signal 704.

Hereinafter, the conventional example will be described in more detail.

FIG. 8 is a diagram showing conventional structures of transmission frames including encoded audio information. A transmission frame is a part of the transmission signal 704. A series of transmission frames are output as the transmission signal 704 by the signal transmission apparatus 701.

FIG. 8(a) is a diagram showing a structure of a transmission frame 800 including encoded audio information 803. The encoded audio information 803 is one-frame data obtained by dividing encoded audio information having a sampling frequency of 48 kHz into frames. FIG. 8(b) is a diagram showing a structure of a transmission frame 850 including encoded audio information 853. The encoded audio information 853 is one-frame data obtained by dividing encoded audio information having a sampling frequency of 24 kHz into frames. In this case, an encoding method for encoded audio information having a sampling frequency of 48 kHz is the same as an encoding method for encoded audio information having a sampling frequency of 24 kHz, that is, an encoding method for the encoded audio information 803 is the same as an encoding method for the encoded audio information 853.

As shown in FIG. 8(a), the transmission frame 800 consists of one block. The transmission frame 800 includes a header portion 801 and a body portion 802. The header portion 801 stores management information 811. The body portion 802 stores data information 812. The management information 811 includes synchronization word information 821 and side information 822. The data information 812 includes encoded audio information 803. The data information 812 may include non "encoded audio information" 823.

The signal transmission apparatus 701 of FIG. 7 generates the transmission frame 800 from a signal input to the signal transmission apparatus 701, and outputs the transmission signal 704 including a series of transmission frames 800 to the digital interface 702.

The management information 811 is information for managing data stored in the body portion 802. As the data, the encoded audio information 803 and the non "encoded audio information" 823 are stored in the body portion 802. The management information 811 includes information indicating whether the data stored in the body portion 602 is valid. The synchronization word information 821 indicates the start of the block of the transmission frame 800. The synchronization word information 821 is used to obtain the repetition time between each transmission frame 800 sequentially transmitted. The side information 822 indicates whether the encoded audio information 803 is stored in the body portion 802. The non "encoded audio information" 823 indicates the absence of encoded audio information. The non "encoded audio information" 823 is used to make the size of the data information 812 constant.

As shown in FIG. 8(*b*), the transmission frame 850 consists of one block. The transmission frame 850 includes a header portion 851 and a body portion 852. The header portion 851 stores management information 861. The body portion 852 stores the data information 862. The management information 861 includes synchronization word information 871 and aide information 872. The data information 862 includes encoded audio information 853. The data information 862 may include non "encoded audio information" 873.

The signal transmission apparatus 701 of FIG. 7 generates the transmission frame 850 from a signal input to the transmission apparatus 701, and outputs the transmission signal 704 including a series of transmission frames 850 to the digital interface 702.

The management information 861 is information for managing data stored in the body portion 852. As the date, the encoded audio information 853 and the non "encoded audio information" 873 are stored in the body portion 852. The management information 861 includes information indicating whether the data stored in the body portion 850 is valid. The synchronization word information 871 indicates the start of the block of the transmission frame 850. The synchronization word information 871 is used to obtain a repetition time between each transmission frame 850 sequentially transmitted. The side information 872 indicates whether the encoded audio information 853 is stored in the body portion 852. The non "encoded audio information" 873 indicates the absence of encoded audio information. The non "encoded audio information" 873 is used to make the size of the data information 862 constant. The size of the body portion 852 is twice as large as the size of the body portion 802 of the transmission frame 800.

As described above, the encoded audio information 803 and the encoded audio information 853 are both one-frame data (i.e., data having the same number of samples) which are encoded by the same encoding method. However, since the sampling frequency of the encoded audio information 803 is different from the sampling frequency of the encoded audio information 853, a reproduction time of the encoded audio information 803 is different from that of the encoded audio information 853. Further, a time required for the transmission frame 800 including the encoded audio information 803 to be received by the signal reception apparatus 703 is different from a time required for the transmission frame 850 including the encoded audio information 853 to be received by the signal reception apparatus 703.

In the above-described case, the time required for the reception of the transmission frame 850 is twice as long as the time required for the reception of the transmission frame 800. The time required for the reproduction of the encoded audio information 853 is twice as long as the time required for the reproduction of the encoded audio information 803. Further, the repetition time of a transmission signal including the transmission frame 850 is twice as long as the repetition time of a transmission signal including the transmission frame 800.

As described above with reference to FIG. 8, when the sampling frequency of one type of encoded audio information is ½ of the sampling frequency of the other type of encoded audio information, the repetition time of a transmission signal carrying the one type of encoded audio information is twice as long as the repetition time of the other type of encoded audio information. Similarly, when the sampling frequency of one type of encoded audio information is 1/N of the sampling frequency of the other type of encoded audio information, the repetition time of a transmission signal carrying the one type of encoded audio information is N times as long as the repetition time of the other type of encoded audio information, where N is a natural number more than or equal to 2. When the sampling frequency of encoded audio information is decreased by a factor of 1/N, the size of a body portion received by the signal reception apparatus 703 is increased by a factor of N. As a result, the repetition time is also increased by a factor of N.

As described above, although the same encoding method is used, a repetition time varies depending on the sampling frequency of encoded audio information. If the transmission signal 704 is transmitted without notifying the signal reception apparatus 703 that a different repetition time is used, the signal reception apparatus 703 cannot be correctly synchronized with the transmission signal 704. Therefore, the signal reception apparatus 703 needs to be at least notified that a repetition time has been changed in order to correctly receive the transmission signal 704.

Alternatively, certain information relating to the sampling frequency of encoded audio information is defined in the management information in order to intermittently notify the signal reception apparatus 703 of the repetition time of the transmission signal 704. Conventionally, in the ISO/IEC61397 standard, when the same encoding method is used but a different repetition time is used, a different value is defined in data type information. The data type information relating to data information is included in the management information. However, when different data type information is defined for each sampling frequency, the number of data types to be written in data type information is increased. As a result, the bit field of the data type information cannot be effectively used, so that the bit field of the data type information becomes insufficient.

SUMMARY OF THE INVENTION

According to one aspect of the present invention, a signal transmission apparatus is provided for transmitting a plurality of pieces of encoded audio information encoded by the same encoding method via a digital interface to a signal reception apparatus, in which each of the plurality of pieces of encoded audio information has a sampling frequency of F or ½×F. The apparatus comprises a data generating section for, based on one-frame data obtained by dividing the encoded audio information into frames, generating at least one block, and a data output section for outputting the at least one block generated by the data generating section to the digital interface. Each of the at least one block includes a body portion, and a header portion storing management information for managing data stored in the body portion. The management information includes synchronization word information indicating a start of the block, and information indicating whether data stored in the body portion is valid. When the encoded audio information has a sampling frequency of F, the data generating section generates one block for one-frame data of the encoded audio information, stores one-frame data of the encoded audio information in the body portion of the generated block, and stores in the header portion of the generated block the management information including information indicating that data stored in the body portion of the generated block is valid. When the encoded audio information has a sampling frequency of ½×F, the data generating section generates a pair of blocks including a previous block and a subsequent block for one-frame data of the encoded audio information, stores one-frame data of the encoded audio information in the body portion of the generated previous block, stores in the header portion of the generated previous block the management information including information indicating that data stored in the body portion of the generated previous block is valid, and stores in the header portion of the generated subsequent block the management information including information indicating that data stored in the body portion of the generated subsequent block is invalid. The sizes of the previous block and the subsequent block generated by the data generating section when the encoded audio information has a sampling frequency of ½×F are each equal to the size of the one block generated by the data generating section when the encoded audio information has a sampling frequency of F.

In one embodiment of this invention, the information indicating whether data stored in the body portion is valid is side information indicating whether the encoded audio information is stored in the body portion, and when the side information indicates that the encoded audio information is not stored in the body portion, the side information indicates that the data stored in the body portion is invalid.

In one embodiment of this invention, the data generating section stores stuffing information in the body portion in the subsequent block.

In one embodiment of this invention, the management information further includes data type information indicating an encoding method for data stored in the body portion. The data type information of the previous block is the same as the data type information of the block generated when the encoded audio information has a sampling frequency of F. The data type information of the subsequent block indicates an encoding method for data stored in the body portion of the previous block irrespective of an encoding method for data stored in the body portion of the subsequent block.

According to another aspect of the present invention a signal transmission apparatus is provided for transmitting a plurality of pieces of encoded audio information encoded by the same encoding method via a digital interface to a signal reception apparatus, in which each of the plurality of pieces of encoded audio information has a sampling frequency of F or 1/N×F, where N is a natural number greater than or equal to 2. The apparatus comprises a data generating section for, based on one-frame data obtained by dividing the encoded audio information into frames, generating at least one block, and a data output section for outputting the at least one block generated by the data generating section to the digital interface. Each of the at least one block includes a body portion, and a header portion storing management information for managing data stored in the body portion. The management information includes synchronization word information indicating a start of the block, and information indicating whether data stored in the body portion is valid. When the encoded audio information has a sampling frequency of F, the data generating section generates one block for one-frame data of the encoded audio information, stores one-frame data of the encoded audio information in the body portion of the generated block, and stores in the header portion of the generated block the management information including information indicating that data stored in the body portion of the generated block is valid. When the encoded audio information has a sampling frequency of 1/N×F, the data generating section generates a set of N blocks for one-frame data of the encoded audio information, stores one-frame data of the encoded audio information in the body portion of a first block of the N generated blocks to be output first, stores in the header portion of the first block the management information including information indicating that data stored in the body portion of the first block is valid, and stores in the header portion of each block of the N generated blocks other than the first block the management information including information indicating that data stored in the body portion of the each block is invalid. The sizes of the N blocks generated by the data generating section when the encoded audio information has a sampling frequency of 1/N×F are each equal to the size of the one block generated by the data generating section when the encoded audio information has a sampling, frequency of F.

According to another aspect of the present invention, a signal transmission method is provided for transmitting a plurality of pieces of encoded audio information encoded by the same encoding method via a digital interface to a signal reception apparatus, in which each of the plurality of pieces of encoded audio information has a sampling frequency of F or ½×F. The method comprises the steps of generating at least one block based on one-frame data obtained by dividing the encoded audio information into frames, and outputting the at least one block generated by the data generating step to the digital interface. Each of the at least one block includes a body portion, and a header portion storing management information for managing data stored in the body portion. The management information includes synchronization word information indicating a start of the block, and information indicating whether data stored in the body portion is valid. When the encoded audio information has a sampling frequency of F, the data generating step includes the step of generating one block for one-frame data of the encoded audio information, storing one-frame data of the encoded audio information in the body portion of the generated block, and storing in the header portion of the generated block the management information including information indicating that data stored in the body portion of the generated block is valid. When the encoded audio information has a sampling frequency of ½×F, the data generating step includes the step of generating a pair of blocks including a previous block and a subsequent block for one-frame data of the encoded audio information, stores one-frame data of the encoded audio information in the body portion of the generated previous block, storing in the header portion of the generated previous block the management information including information indicating that data stored in the body portion of the generated previous block is valid, and storing in the header portion of the generated subsequent block the management information including information indicating that data stored in the body portion of the generated subsequent block is invalid. The sizes of the previous block and the subsequent block generated by the data generating step when the encoded audio information has a sampling frequency of ½×F are each equal to the size of the one block generated by the data generating step when the encoded audio information has a sampling frequency of F.

In one embodiment of this invention, the information indicating whether data stored in the body portion is valid is side information indicating whether the encoded audio information is stored in the body portion, and when the side information indicates that the encoded audio information is not stored in the body portion, the side information indicates that the data stored in the body portion is invalid.

In one embodiment of this invention, the data generating step stores stuffing information in the body portion in the subsequent block.

In one embodiment of this invention, the management information further includes data type information indicating an encoding method for data stored in the body portion. The data type information of the previous block is the same as the data type information of the block generated when the encoded audio information has a sampling frequency of F. The data type information of the subsequent block indicates an encoding method for data stored in the body portion of the previous block irrespective of an encoding method for data stored in the body portion of the subsequent block.

According to another aspect of the present invention, a signal transmission method is provided for transmitting a plurality of pieces of encoded audio information encoded by the same encoding method via a digital interface to a signal reception apparatus, in which each of the plurality of pieces of encoded audio information has a sampling frequency of F or 1/N×F, where N is a natural number greater than or equal to 2. The method comprises the steps of generating at least one block based on one-frame data obtained by dividing the encoded audio information into frames, and outputting the at least one block generated by the data generating step to the digital interface. Each of the at least one block includes a body portion, and a header portion storing management information for managing data stored in the body portion. The management information includes synchronization word information indicating a start of the block, and information indicating whether data stored in the body portion is valid. When the encoded audio information has a sampling frequency of F, the data generating step includes the step of generating one block for one-frame data of the encoded audio information, storing one-frame data of the encoded audio information in the body portion of the generated block, and storing in the header portion of the generated block the management information including information indicating that data stored in the body portion of the generated block is valid. When the encoded audio information has a sampling frequency of 1/N×F, the data generating step include the step of generating a set of N blocks for one-frame data of the encoded audio information, storing one-frame data of the encoded audio information in the body portion of a first block of the N generated blocks to be output first, storing in the header portion of the first block the management information including information indicating that data stored in the body portion of the first block is valid, and storing in the header portion of each block of the N generated blocks other than the first block the management information including information indicating that data stored in the body portion of the each block is invalid. The sizes of the N blocks generated by the data generating step when the encoded audio information has a sampling frequency of 1/N×F are each equal to the size of the one block generated by the data generating section when the encoded audio information has a sampling frequency of F.

As described above, in the present inventions even when encoded audio information has different sampling frequencies, a transmission signal can be transmitted without changing a repetition time by sequentially transmitting a plurality of blocks having the same size.

Specifically, when the sampling frequency of one type of encoded audio information is ½ of the sampling frequency of the other type of encoded audio information, two blocks having the same size as the size of a block which is used when one-frame data of the other type of encoded audio information is transmitted are generated based on one-frame data of the one of encoded audio information and the two blocks are sequentially transmitted. Each of the two transmitted blocks stores synchronization word information indicating the start of the block, so that the repetition time of the transmission signal is constant irrespective of the sampling frequencies of encoded audio information. Therefore, the signal reception apparatus does not need to be notified of the repetition time. As a result, the data type information of a transmission signal for transmitting encoded audio information having different sampling frequencies can be defined to be the same.

Further, according to the present invention, management information stored in the header portion of a block generated by the data generating section includes information indicating whether data stored in the body portion of the block is valid. Therefore, a signal reception apparatus receiving the block can retrieve information indicating whether data stored in the body portion of a block in a header portion is valid so as to judge whether the data stored in the body portion of the block is valid.

Still further, according to the present invention, when encoded audio information has a sampling frequency of ½×F, the body portion of a previous block stores one-frame data of the encoded audio information while the header portion of the previous block stores information that data stored in the body portion of the previous block is valid and the header portion of a subsequent block stores information indicating that data stored in the body portion of the subsequent block is invalid. Therefore, a signal reception apparatus can extract encoded audio information by extracting only the body portion of the previous block. In such a case, the latency of a signal reception apparatus can be set to a constant time.

The header portion of the subsequent block stores information indicating that encoded audio information is not stored in the body portion of the subsequent block. Therefore, the signal reception apparatus does not need to extract data stored in the body portion of the subsequent block. In such a case, the body portion of the subsequent block may store stuffing information.

When payload length information stored in the header portion of the subsequent block indicates that the payload length of the body portion of the subsequent block is less than a minimum value (e.g., zero), the signal reception apparatus does not need to extract the body portion of the subsequent block. The signal reception apparatus can receive the entirety of the one-frame data of encoded audio information only by extracting only the body portion of the previous block including encoded audio information.

In the above description, although the sampling frequency of one type of encoded audio information is ½ of the sampling frequency of the other type of encoded audio information, the present invention is not limited to this.

When the sampling frequency of one type of encoded audio information is 1/N of the sampling frequency of the other type of encoded audio information, N blocks having the same size as the size of a block of when one-frame data of the other type of encoded audio information is transmitted may be generated based on one-frame data of the one type of encoded audio information and the N generated blocks may be sequentially transmitted. In this case, N is a natural number greater than or equal to 2.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

One-frame data of encoded audio information is herein a minimum unit which can be singly decoded or reproduced.

The term "frame" as used herein refers to a predetermined interval including a predetermined number of data (samples) in a data stream. The predetermined number is, for example, 1024.

The term "transmission frame" as used herein refers to a transmission unit corresponding to one-frame data of encoded audio information to be transmitted to a digital interface.

The principle of the present invention will be described below.

Figure 1:
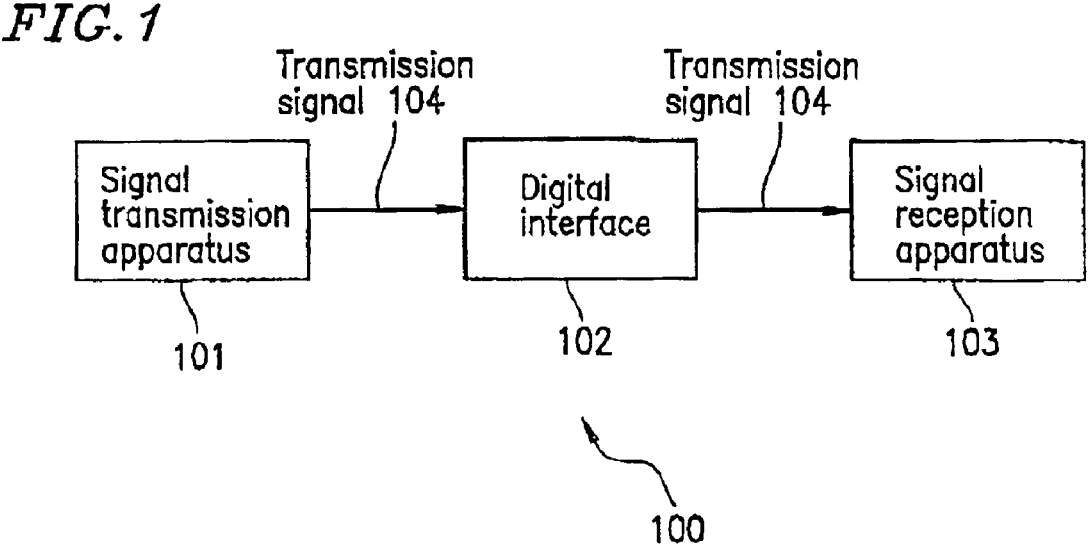
FIG. 1 is a diagram for explaining an audio data processing apparatus according to the present invention.

FIG. 1 is a diagram for explaining an audio data processing apparatus 100 according to the present invention. The audio data processing apparatus 100 includes a signal transmission apparatus 101 for transmitting a transmission signal 104 including encoded audio information, a signal reception apparatus 103 for receiving the transmission signal 104, and a digital interface 102 for mediating the transmission signal 104 between the signal transmission apparatus 101 and the signal reception apparatus 103. The digital interface 102 may be, for example, a device for recording the transmission signal 104. The signal reception apparatus 103 may be, for example, a device for reproducing the transmission signal 104.

Now, it is assumed that encoded audio information obtained by the same encoding method but with different sampling frequencies is transmitted via the same digital interface 102 to the signal reception apparatus 103. The transmission clock of the digital interface 102 and the reception clock of the signal reception apparatus 103 are both set to constant values while it is presumed that encoded audio information has a sampling frequency of 48 kHz.

For the sake of simplicity, FIG. 1 shows that a single signal transmission apparatus 101 transmits the transmission signal 104 via a single digital interface 102 to a single signal reception apparatus 103. The present invention is not limited to this. For example, a single digital interface 102 may be connected to a plurality of signal reception apparatuses 103 so that the transmission signal 104 is transmitted simultaneously to the plurality of signal reception apparatuses 103. Alternatively, a single signal transmission apparatus 101 is connected to a plurality of digital interfaces 102 so that the transmission signal 104 may be transmitted to a further large number of signal reception apparatuses 103.

Figure 2:
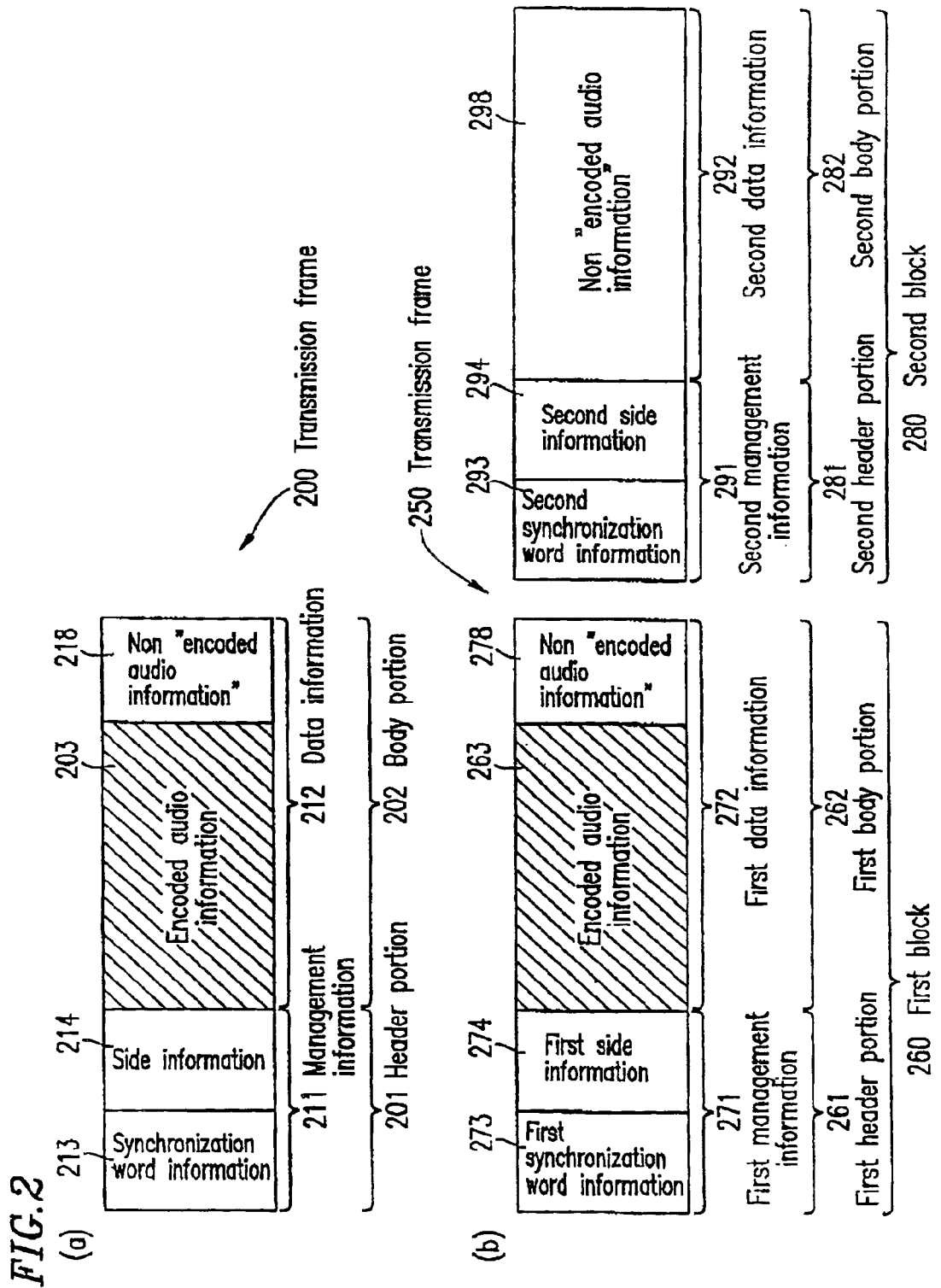
FIG. 2 is a diagram showing structures of transmission frames according to the present invention.

FIG. 2 is a diagram showing structures of transmission frames of the present invention including encoded audio information. The transmission frame is a part of the transmission signal 104. The transmission frames are sequentially output from the signal transmission apparatus 101.

FIG. 2(a) shows a structure of a transmission frame 200 including encoded audio information 203. The encoded audio information 203 is one-frame data obtained by dividing encoding audio information having a sampling frequency of 48 kHz into frames. FIG. 2(b) shows a structure of a transmission frame 250 including encoded audio information 263. The encoded audio information 263 is one-frame data obtained by dividing encoding audio information having a sampling frequency of 24 kHz into frames. In this case, an encoding method for the encoded audio information 203 is the same as an encoding method for the encoded audio information 263.

As shown in FIG. 2(a), the transmission frame 200 consists of one block. The transmission frame 200 includes a header portion 201 and a body portion 202. The header portion 201 stores management information 211. The body portion 202 stores data information 212. The management information 211 includes synchronization word information 213 and aide information 214. The data information 212 includes the encoded audio information 203. The data information 212 may include non "encoded audio information" 218.

The signal transmission apparatus 101 of FIG. 1 generates the transmission frame 200 from a signal input to the signal transmission apparatus 101, and outputs the transmission signal 104 including a series of transmission frames 200 to the digital interface 102.

The management information 211 is information for managing data stored in the body portion 202. As the data, encoded audio information 203 and non "encoded audio information" 218 are stored in the body portion 202. The management information 211 includes information indicating whether the data stored in the body portion 202 is valid. In this case, since the body portion 202 stores the encoded audio information 203, the information indicates that data stored in the body portion 202 is valid. The synchronization word information 213 is located at the head of the block of the transmission frame 200, indicating the start of the block of the transmission frame 200. The synchronization word information 213 is used to obtain the repetition time between each transmission frame 200 sequentially transmitted. An example of the information indicating whether data stored in the body portion 202 is valid is the side information 214. The side information 214 indicates whether the encoded audio information 203 is stored in the body portion 202. The non "encoded audio information" 218 indicates the absence of encoded audio information. The non "encoded audio information" 218 is used to make the size of the data information 212 constant.

As shown in FIG. 2(b), the transmission frame 250 includes a first block 260 and a second block 280.

The first block 260 includes a first header portion 261 and a first body portion 262. The first header portion 261 stores first management information 271. The first body portion 262 stores first data information 272. The first management information 271 includes first synchronization word information 273 and first side information 274. The first data information 272 includes is the encoded audio information 263. The first data information 272 may include non "encoded audio information" 278.

The first management information 271 is information for managing data stored in the first body portion 262. As the data, encoded audio information 263 and non "encoded audio information" 278 are stored in the first body portion 262. The first management information 271 includes information indicating whether the data stored in the first body portion 262 is valid. In this case, since the first body portion 262 stores the encoded audio information 263, the first management information 271 indicates that data stored in the first body portion 262 is valid. The first synchronization word information 273 is located at the head of a first block 260 of the transmission frame 250, indicating the start of the first block 260 of the transmission frame 250. The first synchronization word information 273 is used to obtain the repetition time between the first block 260 and a second block 280 which are sequentially transmitted. An example of the information indicating whether data stored in the first body portion 262 is valid is the first side information 274. The first side information 274 indicates whether the encoded audio information 263 is stored in the first body portion 262. The non "encoded audio information" 278 indicates the absence of encoded audio information. The non "encoded audio information" 278 is used to make the size of the first data information 272 constant.

The second block 280 includes a second header portion 281 and a second body portion 282. The second header portion 281 stores second management information 291. The second body portion 282 stores second data information 292. The second management information 291 includes second synchronization word information 293 and second side information 294. The second data information 292 includes non "encoded audio information" 298.

The second management information 291 is information for managing data stored in the second body portion 282. As the data, non "encoded audio information" 298 is stored in the second body portion 282. The second management information 291 includes information indicating whether the data stored in the second body portion 282 is valid. In this case, since the second body portion 282 does not store encoded audio information, the second management information 291 indicates that data stored in the second body portion 282 is invalid. The second synchronization word information 293 is located at the head of a second block 280 of the transmission frame 250, indicating the start of the second block 280 of the transmission frame 250. The second synchronization word information 293 is used to obtain the repetition time between the first block 260 and a second block 280 which are sequentially transmitted. An example of the information indicating whether data stored in the second body portion 282 is valid is the second side information 294. The second side information 294 indicates whether encoded audio information is stored in the second body portion 282. The non "encoded audio information" 298 indicates the absence of encoded audio information. The non "encoded audio information" 298 is used to make the size of the second data information 292 constant.

In this case, the size of the first body portion 262 is equal to the size of the second body portion 282. Further, the size of the first body portion 262 is equal to the size of the body portion 212. Furthermore, the header portion 201, the first header portion 261, and the second header portion 281 have the same size. Therefore, one block of the transmission frame 200, the first block 260, and the second block 280 have the same size.

The signal transmission apparatus 101 of FIG. 1 generates the transmission frame 250 from a signal input to the signal transmission apparatus 101, and outputs the transmission signal 104 including a series of transmission frames 250 to the digital interface 102. The first block 260 is output earlier than the second block 280.

Figure 8:
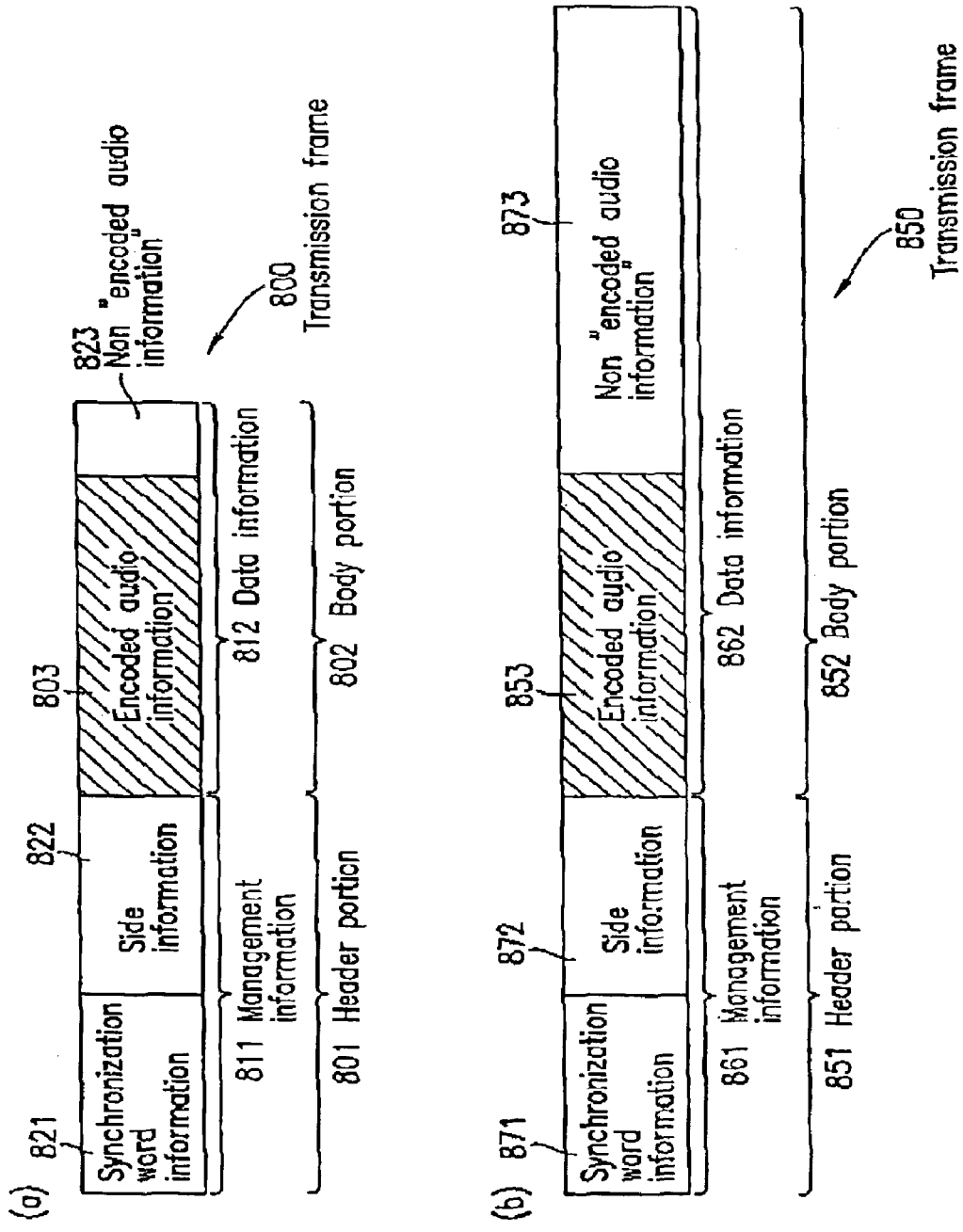
FIG. 8 is a diagram showing structures of conventional transmission frames.

In this case, the transmission frame 250 of FIG. 3(b) of the present invention can be compared with the conventional transmission frame 850 of FIG. 8(b). The two equal parts of the data information 862 of the transmission frame 850 correspond to the first data information 272 of the first block 260 and the second data information 292 of the second block 280 in the transmission frame 250. The size of the body portion 852 is equal to the sum of the size of the first body portion 262 and the size of the second body portion 282. Further, the encoded audio information 263 corresponds to the encoded audio information 853.

Referring to FIG. 2(b), the first synchronization word information 273 indicates the start of the first block 260, and the second synchronization word information 293 indicates the start of the second block 280. In this case, the repetition time between the first block 260 and the second block 280 is equal to the repetition time between each of the sequential transmission frames 200.

With the above-described structure, even when the sampling frequency of the encoded audio information 263 is different from the sampling frequency of the encoded audio information 203, the repetition time of a transmission signal is constant. Therefore, the signal reception apparatus 103 can correctly receive a transmission signal even if the signal reception apparatus 103 is not notified of a change in the repetition time.

Since the entirety of the encoded audio information 263 is included in the first data information 272, the second data information 292 is the non "encoded audio information" 298 indicating the absence of encoded audio information. Therefore, the encoded audio information 263 itself is transmitted using only the first block 260 in the transmission frame 250. As a result, the signal reception apparatus 103 can always set the latency of encoded audio information to the same time.

Hereinafter, the present invention will be summarized.

According to the present invention, a data generating section generates one block for one-frame data of encoded audio information when the encoded audio information has a sampling frequency of F, and generates a pair of blocks including a previous block and a subsequent block for one-frame data of encoded audio information when the encoded audio information has a sampling frequency of ½×F. The size of each of the previous block and the subsequent block generated by the data generating section for one-frame data of encoded audio information when the encoded audio information has a sampling frequency of ½×F, is equal to one block generated by the data generating section for one-frame data of encoded audio information when the encoded audio information has a sampling frequency of F. Further, each of the blocks generated by the data generating section includes synchronization word information indicating the start of the block.

Therefore, the repetition time between each block generated for encoded audio information having a sampling frequency of ½×F is equal to the repetition time between each block generated for encoded audio information having a sampling frequency of F. As a result, the signal transmission apparatus can transmit encoded audio information having a sampling frequency of ½×F and encoded audio information having a sampling frequency of F without providing notification of a change in the repetition time.

Further, according to the present invention, management information stored in the header portion of a block generated by the data generating section includes information indicating whether data stored in the body portion of the block is valid. Therefore, the signal reception apparatus receiving the block retrieves, from the head portion, the information indicating whether data stored in the body portion of the block is valid and judges whether the data stored in the body portion of the block is valid.

Furthermore, according to the present invention, when encoded audio information has a sampling frequency of ½×F, one-frame data of the encoded audio information is stored in the body portion of the previous block, and information indicating that the data stored in the body portion of the previous block is valid is stored in the header portion of the previous block while information indicating that the data stored in the body portion of the subsequent block is invalid is stored in the header portion of the subsequent block. Therefore, the signal reception apparatus can extract encoded audio information by extracting only the body portion of the previous block. In this case, the latency of the signal reception apparatus receiving one-frame data of encoded audio information is constant.

Figure 3:
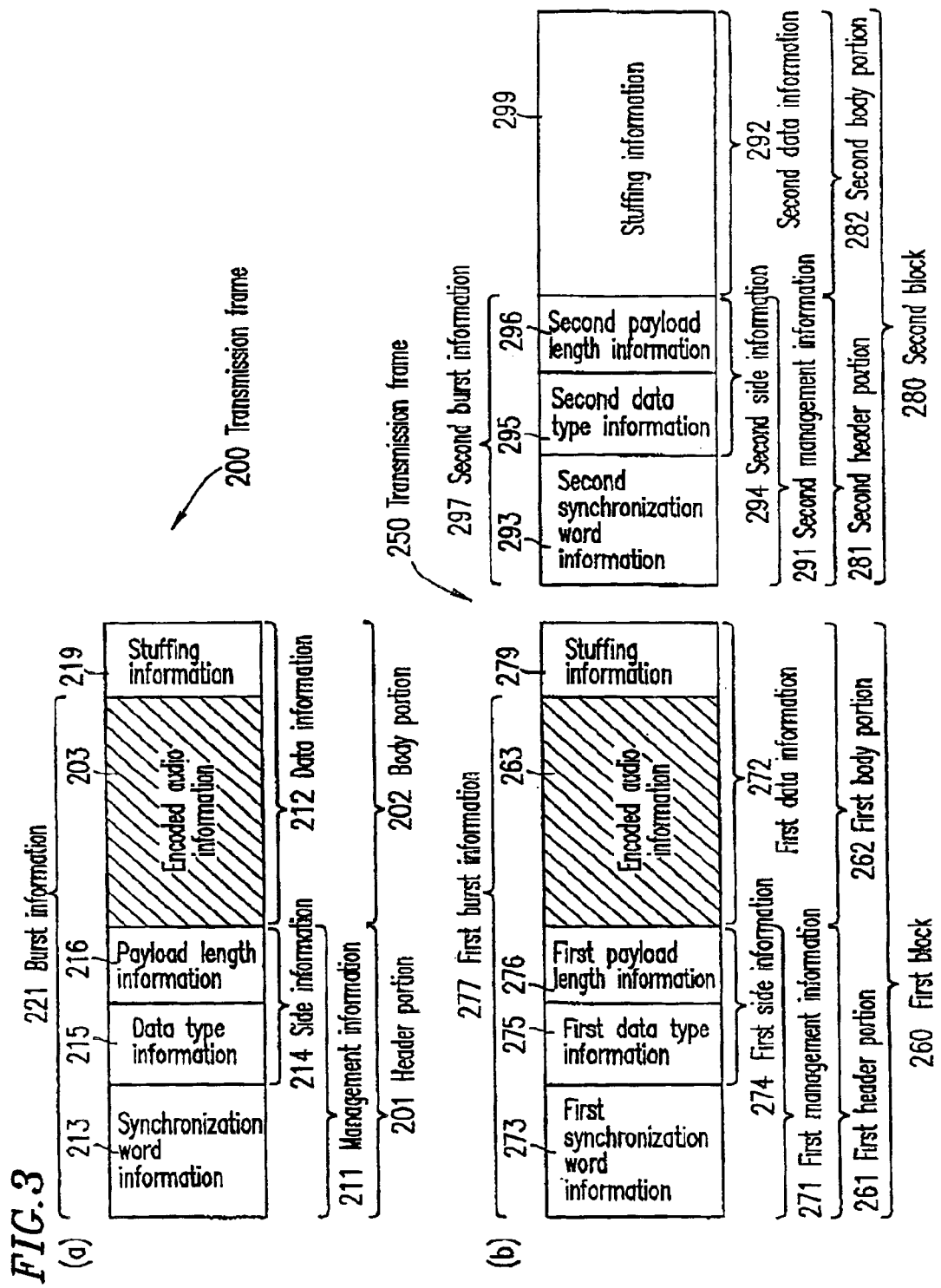
FIG. 3 is a diagram showing detailed structures of the transmission frames of FIG. 2.

FIG. 3 is a diagram showing the detailed structures of the transmission frames of FIG. 2. In FIGS. 2 and 3, like parts are referenced by like numerals and description thereof is omitted.

As shown in FIG. 3(a), in a transmission frame 200, side information 214 includes data type information 215 and payload length information 216. The data type information 215 is information about an encoding method for data stored in a body portion 202. The payload length information 216 is information about the length (payload length) of encoded audio information 203 in the body portion 202.

The data information 212 may include stuffing information 215. The stuffing information 215 is stuffed with zero, which is a type of non "encoded audio information" 218 (FIG. 2(a)).

Burst information 221 includes synchronization word information 213, the side information 214, and the encoded audio information 203. The burst information 221 represents a data packet of the transmission frame 200.

As shown in FIG. 3(b), in a first block 260, the first side information 274 includes first data type information 275 and first payload length information 276. The first data type information 275 includes information about an encoding method for data stored in the first body portion 262. The first payload length information 276 is information about the length (first payload length) of the encoded audio information 263 in the first body portion 262.

The first data information 272 may include stuffing information 279. The stuffing information 279 is stuffed with zero, which is a type of non "encoded audio information" 278 (FIG. 2(b)).

First burst information 277 includes first synchronization word information 273, the first side information 274, and the encoded audio information 263. The first burst information 277 represents a data packet of the first block 260.

Second side information 294 includes second data type information 295 and second payload length information 296. In an example of the present invention, the second data type information 295 may be information about an encoding method for data stored in the second body portion 282. In another example of the present invention, the second data type information 295 may be information about an encoding method for data stored in the first body portion 262 of the first block 260 irrespective of an encoding method for data stored in the second body portion 282. The second payload length information 296 is information about the length (second payload length) of encoded audio information in the second body portion 282. In this case, the second payload length information 296 indicates that the second payload length of the second body portion 282 is less than a predetermined minimum value (e.g., zero). The signal reception apparatus 103 (FIG. 1) retrieves the second payload length information 296, so that the absence of encoded audio information in the second block 280 can be determined without directly detecting the entirety of the second body portion 282.

The second data information 292 may include stuffing information 299. The stuffing information 299 is stuffed with zero, which is a type of non "encoded audio information" 298 (FIG. 2(b)).

Second burst information 297 includes second synchronization word information 293 and second side information 294. The second burst information 297 represents a data packet of the second block 280.

The signal transmission apparatus 101 of FIG. 1 generates the transmission frame 250 from a signal input to the signal transmission apparatus 101, and outputs the transmission signal 104 including a series of transmission frames 250 to the digital interface 102.

In this example of the present invention, since the repetition time of a transmission signal including the encoded audio information 203 is equal to the repetition time of a transmission signal including the encoded audio information 263. Therefore, data type information does not include information about a repetition time, and only indicates an encoding method for data stored in the body portion of a corresponding block. Alternatively, the second data type information 295 may indicate an encoding method for the encoded audio information 263 stored in the first body portion 262 indicated by the first data type information 275.

Further, the signal reception apparatus 103 retrieves the first payload length information 276 and the second payload, length information 296 so as to extract the body portion of a block whose payload length is not less than a predetermined minimum value, thereby making it possible to receive encoded audio information without an extra operation.

Hereinafter, structures of the signal transmission apparatus 101 and the signal reception apparatus 103 of this example will be described. In the following description, a case where an elementary stream in an ADTS format of MPEG2 AAC (Advanced Audio Coding) [hereinafter referred to as an AAC stream] is transmitted will be discussed.

In this case, it is assumed that the sampling frequency of an AAC stream is 24 kHz, and the transmission clock of the digital interface 102 and the reception clock of the signal reception apparatus 103 are designed while the sampling frequency of encoded audio information is presumed to be 48 kHz. It should be noted that the size of the transmission frame 200 is 32768 bits.

Figure 4:
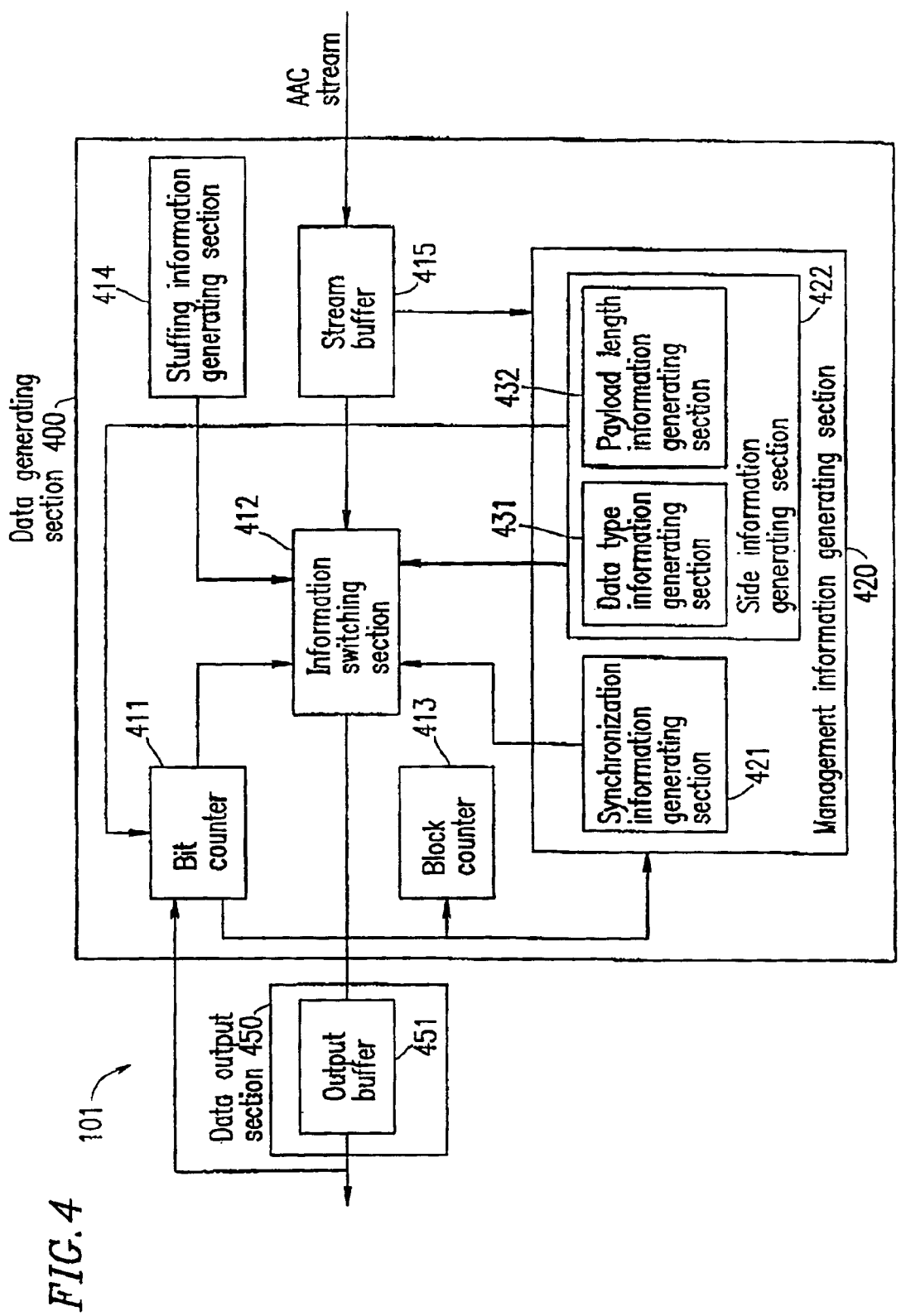
FIG. 4 is a diagram showing a signal transmission apparatus of the present invention.

FIG. 4 is a diagram showing an exemplary structure of the signal transmission apparatus 101 of the present invention.

The signal transmission apparatus 101 includes a data generating section 400 and a data output section 450. The data generating section 400 includes a bit counter 411, an information switching section 412, a block counter 413, a stuffing information generating section 414, a stream buffer 415, and a management information generating section 420. The management information generating section 420 includes a synchronization word information generating section 421 and a side information generating section 422. The side information generating section 422 includes a data type information generating section 431 and a payload length information generating section 432. The data output section 450 includes an output buffer 451.

Hereinafter, a case where the signal transmission apparatus 101 transmits the transmission frame 250 including the first block 260 and the second block 280 of FIG. 3(b) will be described.

The sizes of constituents included in the transmission frame 250 will be described below.

The sizes of the first block 260 and the second block 280 are each 32768 bits. The sizes of the first header portion 261 and the second header portion 281 are each 64 bits. The sizes of the first synchronization word information 273 and the second synchronization word information 293 are each 32 bits. The sizes of the first side information 274 and the second side information 294 are each 32 bits. The sizes of the first data type information 275 and the second data type information 295 are each 16 bits. The sizes of the first payload length information 276 and the second payload length information 296 are each 16 bits.

An operation of the signal transmission apparatus 101 generating the first block 260 of the transmission frame 250 and outputting the generated first block 260 will be described.

After the signal transmission apparatus 101 is activated, the stream buffer 415 receives an AAC stream. The AAC stream includes header information and data information. The header information of the AAC stream includes information about the data information of the AAC stream. The header information of the AAC stream includes, for example, information about the sampling frequency of the data information of the AAC stream, information about the length of a frame (frame length) of the data information of the AAC stream, and information about the type of the data information of the AAC stream. The information about the type of the data information includes information about an encoding method.

The stream buffer 415 outputs the data information of the AAC stream to the information switching section 412, The stream buffer 415 extracts the header information of the AAC stream, and outputs the extracted header information to the management information generating section 420.

The side information generating section 422 of the management information generating section 420 generates the first side information 274 based on the header information of the AAC stream output from the stream buffer 415, and outputs the generated first side information 274 to the information switching section 412.

Specifically, the data type information generating section 431 of the side information generating section 422 generates the first data type information 275 based on information about the type of the data information of the AAC stream included in the header information of the AAC stream, and outputs the generated first data type information 275 to the information switching section 412. The payload length information generating section 431 of the side information generating section 422 generates the first payload length information 276 based on information about a frame length included in the header information of the AAC stream, and outputs the generated first payload length information 276 to the information switching section 412.

The synchronization word information generating section 421 of the management information generating section 420 generates and outputs the first synchronization word information 273 to the information switching section 412.

The stuffing information generating section 414 outputs the stuffing information 279 to the information switching section 412.

The information switching section 412 selects, based on a signal from the bit counter 411, any of at least the one-frame data information of the AAC stream (i.e., the encoded audio information 263), the first synchronization word information 273, the first data type information 275, the first payload length information 276, and the stuffing information 279, and outputs the selected information to the output buffer 451.

The output buffer 451 outputs information output from the information switching section 412 as the first block 260 to the digital interface 102. It should be noted that as described with reference to FIGS. 2 and 3, the transmission frame 250 is a part of the transmission signal 104, and a series of transmission frames 250 are output. The transmission frame 250 includes the first block 260 and the second block 280.

The bit counter 411 counts the number of bits of the first block 260 output from the output buffer 451. The information switching section 412 outputs information, selected based on the count value obtained by the bit counter 411, to the output buffer 451. The information switching section 412 selects a sequence of information in such a manner as to produce the first block 260, and outputs the information to the output buffer 451.

The value of the bit counter 411 at the time when the leading bit of the first block 260 is output from the output buffer 451 is set to zero. The value of the bit counter 411 is incremented by one every time one bit of the first block 260 is output from the output buffer 451. After the value of the bit counter 411 reaches the maximum value, the value of the bit counter 411 is reset to zero and thereafter is increased toward the maximum value again. The maximum value corresponds to the size of the first block 260, i.e., the size of the transmission frame 200. In this example, the maximum value of the bit counter 411 is 32768. With the thus-constructed structure, all bits in a block can be given different numbers.

When the value of the bit counter 411 is in the range of 0 to 31, the information switching section 412 outputs the first synchronization word information 273. Thereafter, when the value of the bit counter 411 is in the range of 32 to 63, the information switching section 412 outputs the first side information 274. Specifically, when the value of the bit counter 411 is in the range of 32 to 47, the information switching section 412 outputs the first data type information 275. When the value of the bit counter 411 is in the range of 48 to 63, the information switching section 412 outputs the first payload length information 276.

The information switching section 412 outputs the encoded audio information 263 once the value of the bit counter 411 is 64 up until the data information of the AAC stream corresponding to one frame (i.e., the encoded audio information 263) is output.

In other words, the information switching section 412 outputs the data information of the AAC stream as the encoded audio information 263 to the output buffer 451 during the time that the value of the bit counter 411 is changed from 64 to the sum of 64 and a value indicated by the first payload length information 276. In this case, the bit counter 411 controls a signal for controlling the information switching section 412 based on the first aide information 274 from the side information generating section 422. Specifically, the bit counter 411 controls a signal for controlling the information switching section 412 based on a first payload length indicated by the first payload length information 276 generated by the payload length information generating section 432.

When the size of the first burst information 277 is less than the size of the first block 260, the information switching section 412 outputs the stuffing information 279 during the time that the value of the bit counter 411 is changed from the sum of 64 and the value of the first payload length to zero.

When the value of the bit counter 411 reaches the maximum value, the value of the bit counter 411 returns to zero and at the same time the value of the block counter 413 is updated from one to zero. In this case, the output operation of the first block 260 is completed and thereafter the output operation of the second block 280 is begun.

The value of the block counter 413 is updated to one when the value of the bit counter 411 returns to zero. In this case, the output operation of the second block 280 is completed and thereafter the output operation of a first block 260 corresponding to another type of encoded audio information is begun.

The block counter 413 indicates a block of a transmission frame to which a signal output from the output buffer 451 is related.

In an example of the present invention, when the value of the block counter 413 is zero, the payload length information generating section 432 converts information about the frame length of the header information of the AAC stream into the number of bits to generate the first payload length information 276. The generated first payload length information 276 is output via the information switching section 412 from the output buffer 451. The first payload length information 276 has a bit field of 16 bits in the first block 260.

When the value of the block counter 413 is not zero (i.e., 1), that is, the second block 280 is transmitted, an operation of the data generating section 400 during the time that the value of the bit counter 411 is in the range of 0 to 47 is similar to when the first block 260 is transmitted.

The payload length information generating section 432 generates the second payload length information 296 in a manner similar to that for the first payload length information 276. When the entirety of the encoded audio information 263 of the transmission frame 250 is included in the first block 260 while the body portion 282 in the second block 280 does not store encoded audio information, all of the 16 bits of the bit field of the second payload length information 296 are zero. Alternatively, the second payload length information 296 has a value less than a predetermined minimum value. In either case, the second payload length information 296 indicates that the second payload length of the second body portion 282 is zero. The information switching section 412 outputs the second payload length information 296 during the time that the value of the bit counter 411 is in the range of 48 to 63.

Since the second payload length is zero, the information switching section 412 outputs the stuffing information 299 to the output buffer 451 during the time that the value of the bit counter 411 is in the range of 63 to the maximum value.

In the above-described operation according to the present invention, the signal transmission apparatus 101 extracts the encoded audio information 263 from the AAC stream input to the signal transmission apparatus 101, and transmits the extracted encoded audio information 263.

Similarly, when the transmission frame 200 is transmitted, the signal transmission apparatus 101 extracts the encoded audio information 203 from the AAC stream input to the signal transmission apparatus 101, and transmits the extracted encoded audio information 203. The transmission frame 200 is generated in a manner similar to the first block 260 of the transmission frame 250.

Further, the stream buffer 415 may obtain the sampling frequency of the data information of the AAC stream based on the header information of the AAC stream, and may modify the operation of the information switching section 412 controlled by the values of the bit counter 411 and the bit counter 411 based on the obtained sampling frequency.

For example, the bit counter 411 may modify the control of the information switching section 412 based on data type information output from the data type information generating section 431. Alternatively, the control of the information switching section 412 may be modified based on information about the type of data information included in the header information of the AAC stream extracted by the stream buffer 415.

With the signal transmission apparatus 101 of this example, when the sampling frequencies of encoded audio information differ from one another, transmission signals having the same repetition time are generated, and the transmission signal 104 including encoded audio information only in the first block of the two blocks is generated. In this case, the signal reception apparatus 103 distinguishes a block in the transmission signal 104 including encoded audio information from a block which does not include encoded audio information, thereby making it possible to correctly receive information.

Further, irrespective of the ratios of the transmission clock of the digital interface 102 and the reception clock of the signal reception apparatus 103 to the sampling frequency of the AAC stream, if the transmission clock of the digital interface 102 and the reception clock of the signal reception apparatus 103 are constant, the signal reception apparatus 103 can receive the transmission signal 104 including encoded audio information having a different sampling frequency at the same latency. Therefore, the signal reception apparatus 103 can be easily synchronized with any other apparatus.

In the above-described example, the AAC stream which has been encoded is input to the stream buffer 415. The present invention is not limited to this. The data generating section 400 may include a device for encoding audio information, and the audio information may be directly input to the data generating section 400.

Figure 5:
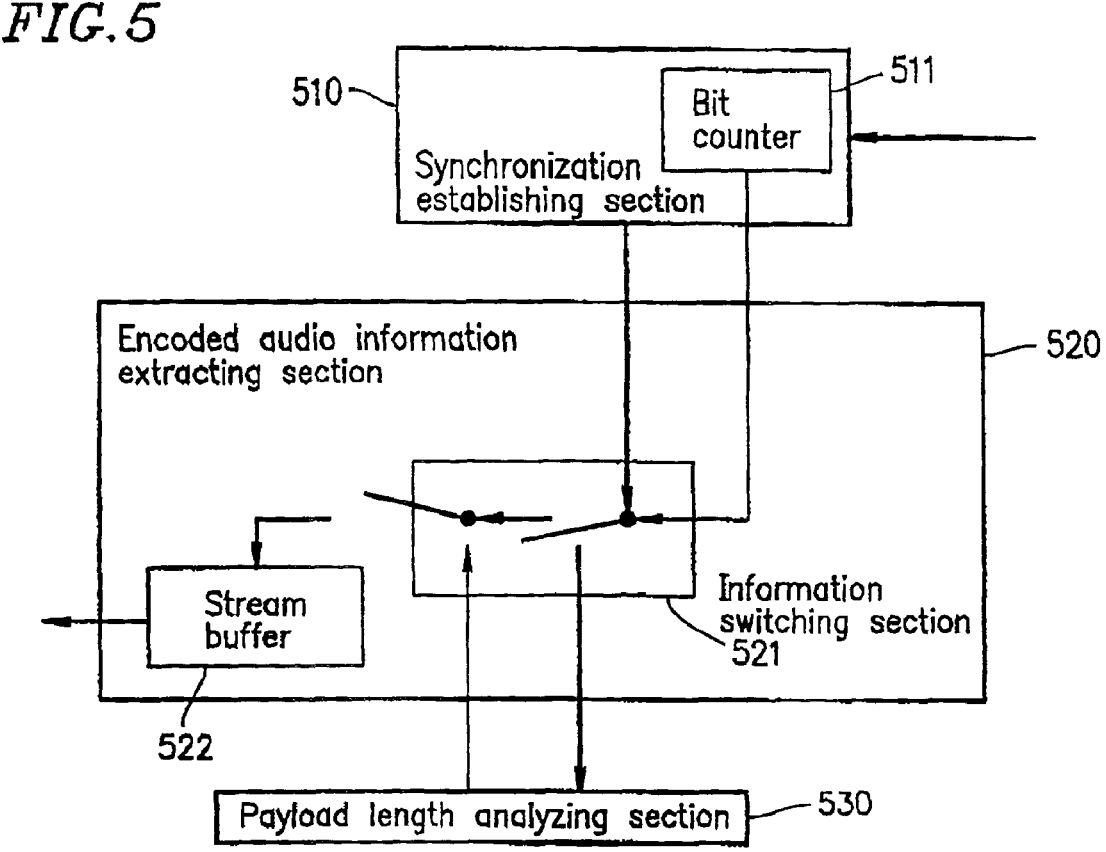
FIG. 5 is a diagram showing a signal reception apparatus according to the present invention.

FIG. 5 is a diagram showing an exemplary structure of the signal reception apparatus 103 of the present invention.

The signal reception apparatus 103 includes a synchronization establishing section 510, an encoded audio information extracting section 520, and a payload length analyzing section 530. The synchronization establishing section 510 includes a bit counter 511. The encoded audio information extracting section 520 includes an information switching section 521 and a stream buffer 522.

Hereinafter, a case where the signal reception apparatus 103 receives the transmission frame 250 of FIG. 3(b) including the first block 260 and the second block 280 will be described.

In the signal reception apparatus 103, the synchronization establishing section 510 retrieves the first synchronization word information 273 of the transmission signal 104 input via the digital interface 102.

After finding the first synchronization word information 273 in the first block 260 of the transmission frame 250, the synchronization establishing section 510 analyzes the first data type information 275 included in the first management information 271.

As a result of the analysis, when it is judged that an encoding method of the encoded audio information 263 in the first block 260 is of a desired type (e.g., AAC stream), the bit counter 511 of the synchronization establishing section 510 is set to zero at intervals having a size corresponding to the repetition time of the signal (in this case, 32768 bits).

The synchronization establishing section 510 judges whether synchronization of the transmission signal 104 is established. The judgment of the synchronization is conducted by determining whether the second synchronization word information 293 is present after the first block 260 from the retrieved first synchronization word information 273, for example. Alternatively, the judgment of the synchronization is conducted based on whether synchronization word information can be detected in intervals (32768 bits) between the first block 260 and the second block 280 in the transmission signal 104 five consecutive times. When synchronization is established the bit counter 511 is set to zero at the head of the first synchronization word information 273, i.e., at the starting point of the block 260 indicated by the first synchronization word information 273.

The value of the bit counter 511 is incremented by one from zero to the maximum value (i.e., 32767) every time one bit of the first block 260 is input from the digital interface 102. The value of the bit counter 511 is reset to zero after reaching the maximum value. Therefore, the value of the bit counter 511 is operated in such a manner as to be reset to zero at the head of the first synchronization word information 273 of the first management information 271, or the head of the second synchronization word information 293 of the second management information 291.

When the synchronization establishing section 510 judges that synchronization is established, the transmission frame 250 is output to the encoded audio information extracting section 520.

In the encoded audio information extracting section 520, the information switching section 521 switches the destinations of the transmission frame 250 in such a manner as to output either the first payload length information 276 of the first block 260 or the second payload length information 296 of the second block 280 in the transmission frame 250 to the payload length analyzing section 530, based on the value of the bit counter 511 (specifically, when the bit counter 511 is in the range of 48 to 63).

The payload length analyzing section 530 analyzes the first payload length information 276 in the first block 260, or the second payload length information 296 in the second block 280 to obtain the first payload length or the second payload length.

In an example of the present invention, when the value of the bit counter 511 is 48, the payload length analyzing section 530 is activated, and 16 bits of each of the first block 260 and the second block 280 corresponding to the value range of the bit counter 511 from 48 to 63 are analyzed to determine the first payload length and the second payload length.

As a result of the analysis of the payload length analyzing section 530, when the payload length is judged to be zero, i.e., encoded audio information is not present in the analyzed block, the encoded audio information extracting section 520 does not read the transmission frame 250 in accordance with a signal from the payload length analyzing section 530 until the bit counter 511 is reset to zero, i.e., the information switching section 521 in the encoded audio information extracting section 520 does not output information about a transmission frame to the stream buffer 522 when the payload length of a block is zero.

As a result of the analysis of the payload length analyzing section 530, when the payload length is judged not to be zero, the information switching section 521 outputs encoded audio information to the stream buffer 522 based on a signal from the payload length analyzing section 530 until the value of the bit counter 511 is changed from 64 to the sum of 64 and the payload length. The stream buffer 522 can output encoded audio information in any form.

In this manner, the signal reception apparatus 103 can receive encoded audio information transmitted via the digital interface 102 and correctly extract only encoded audio information.

In the above-described example, when synchronization word information is detected five consecutive times in a predetermined repetition time, the establishment of synchronization is judged. The present invention is not limited to five consecutive times. The number of times synchronization word information is detected maybe any value as long as accurate synchronization is established. Further, if a similar effect is obtained, synchronization word information does not need to be consecutively detected.

In the above-described example, encoded audio information having a sampling frequency of 24 kHz or 48 kHz is output to the digital interface which is presumed to receive encoded audio information having a sampling frequency of 48 kHz. With such a structure, encoded audio information having a different sampling frequency can be transmitted without notification or modification of the repetition time of a transmission signal.

In the above-described example, the sampling frequency of one type of encoded audio information is ½ of the sampling frequency of the other type of encoded audio information. The present invention is not limited to this. The present invention can be applicable when the sampling frequency of one type of encoded audio information is 1/N of the sampling frequency of the other type of encoded audio information. In this case, N is any natural number more than or equal to 2.

In this case, the number of blocks in a transmission frame is N. Out of the N blocks, for example, only the data information of a first block to be transmitted first includes encoded audio information, and all pieces of data information of blocks other than the first block indicate that no encoded audio information is included in the is respective block. Using such information, encoded audio information is extracted from the data information of only the first block.

Hereinafter, a structure of a transmission frame when N is other than 2, specifically when N is 4, will be described.

Figure 6:
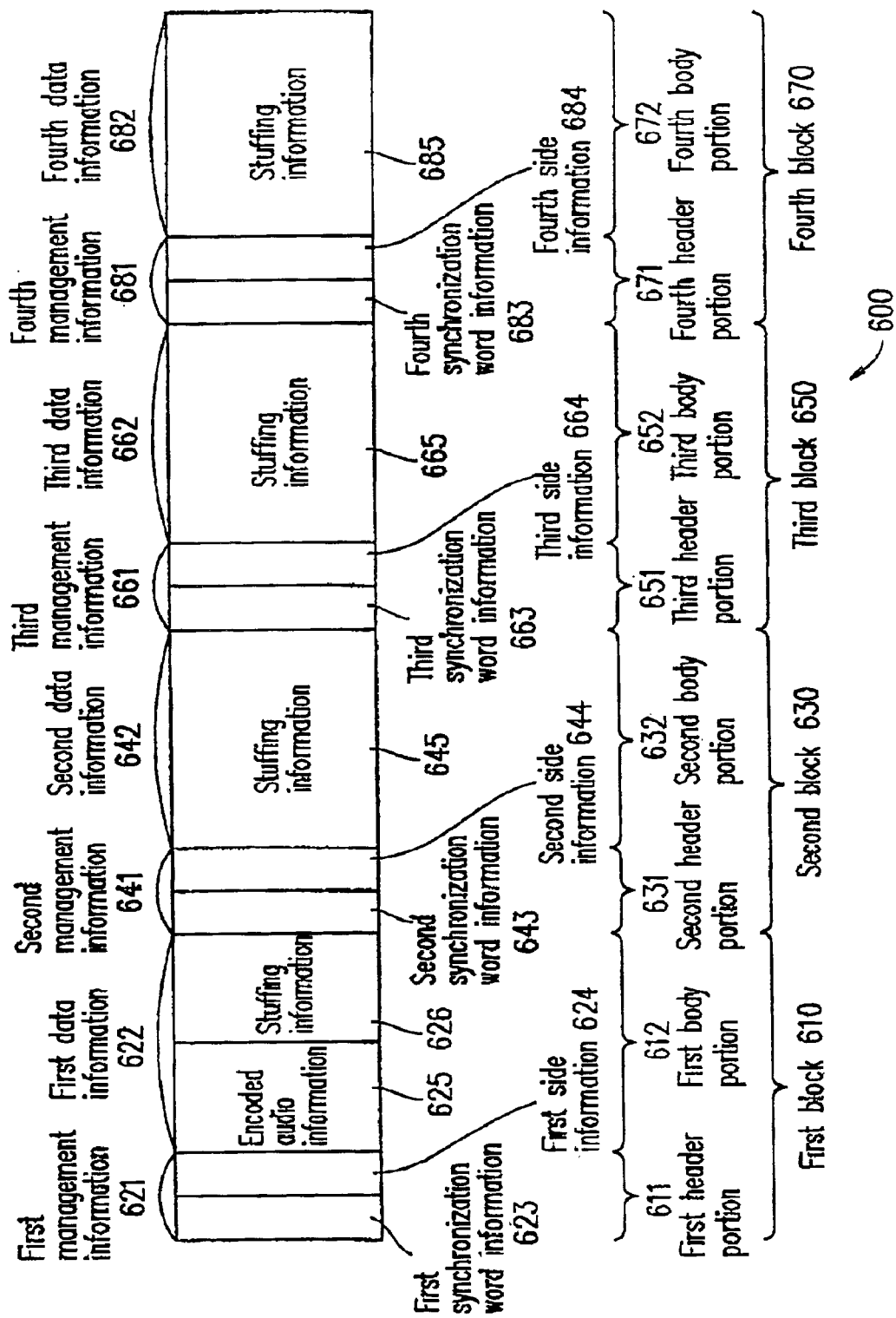
FIG. 6 is a diagram showing a structure of a transmission frame according to the present invention which includes encoding audio information having a sampling frequency of 12 kHz.
Figure 7:
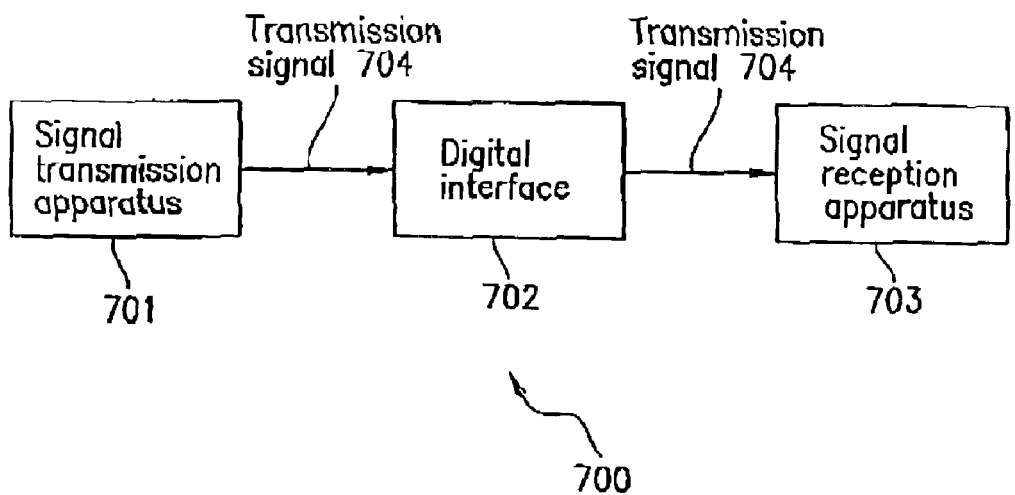
FIG. 7 is a diagram for explaining a conventional audio data processing apparatus.

FIG. 6 is a diagram showing a structure of a transmission frame 600 including four blocks according to the present invention.

It is assumed that, for example, one-frame data of encoded audio information 625 obtained by dividing encoded audio information having a sampling frequency of 12 kHz into frames is transmitted to the digital interface 102 and the signal reception apparatus 103 (FIG. 1) which are presumed to receive encoded audio information having a sampling frequency of 48 kHz. In this case, a transmission frame 600 has a structure as shown in FIG. 6.

The repetition time between blocks of the transmission frame 600 is equal to the repetition time of a transmission signal when the one-frame data of encoded audio information having a sampling frequency of 48 kHz is transmitted to the digital interface 102 and the signal reception apparatus 103 which are presumed to receive a transmission signal having a sampling frequency of 48 kHz.

The transmission frame 600 includes a first block 610, a second block 630, a third block 650, and a fourth block 670.

The first block 610 includes a first header portion 611 and a first body portion 612. The first header portion 611 stores first management information 621. The first body portion 612 stores first data information 622. The first management information 621 includes first synchronization word information 623 and first side information 624. The first data information 622 includes the encoded audio information 625 and stuffing information 626.

The second block 630 includes a second header portion 631 and a second body portion 632. The second header portion 631 stores second management information 641. The second body portion 632 stores second data information 642. The second management information 641 includes second synchronization word information 643 and second side information 644. The second data information 642 includes stuffing information 645.

The third block 650 includes a third header portion 651 and a third body portion 657. The third header portion 651 stores third management information 661. The third body portion 652 stores third data information 662. The third management information 661 includes second third synchronization word information 663 and third side information 664. The third data information 662 includes stuffing information 665.

The fourth block 670 includes a fourth header portion 671 and a fourth body portion 672. The fourth header portion 671 stores fourth management information 681. The fourth body portion 672 stores fourth data information 682. The fourth management information 681 includes fourth synchronization word information 683 and fourth side information 684. The fourth data information 682 includes stuffing information 685.

In this case, the first synchronization word information 623 and the second synchronization word information 643 are used to obtain the repetition time between the first block 610 and the second block 630. The second synchronization word information 643 and the third synchronization word information 663 are used to obtain the repetition time between the second block 630 and the third block 650. The third synchronization word information 663 and the fourth synchronization word information 683 are used to obtain the repetition time between the third block 650 and the fourth block 670. Further, the fourth synchronization word information 683 and the first synchronization word information 623 of an immediately subsequent transmission frame 600 are used to obtain the repetition time between the corresponding blocks.

In the above-described example, since one frame of MPEG2 AAC stream is specifically described, the maximum value of the bit counters 411 (FIG. 4) and 511 (FIG. 5) is 32768. The present invention is not limited to this. The maximum number of the bit counters 411 and 511 is dependent on the number of samples included in encoded audio information and varies among encoding methods.

When encoded audio information is other than the AAC stream, encoded audio information having different sampling frequencies can be transmitted at the same repetition time.

Therefore, according to the present invention, the repetition time between blocks generated from encoded audio information having a sampling frequency of 1/N×F is equal to the repetition time between blocks generated from encoded audio information having a sampling frequency of F. As a result, a signal transmission apparatus can transmit encoded audio information having a sampling frequency of 1/N×F and encoded audio information having a sampling frequency of F without notifying a signal reception apparatus of a change in the repetition time. Therefore, when encoding methods of encoded audio information are the same and the sampling frequencies are different, transmission signals can be defined by the same data type information.

Further, the signal reception apparatus, which receives a transmission signal generated by the signal transmission apparatus or the signal transmission method of the present invention, can retrieve, from a header portion, information indicating whether data stored in the body portion of a block is valid so as to judge whether the data stored in the body portion of the block is valid.

Furthermore, the signal reception apparatus, which receives a transmission signal generated by the signal transmission apparatus or the signal transmission method of the present invention, can extract encoded audio information by extracting only the body portion of a first output block. In this case, the latency of the signal reception apparatus receiving one-frame data of encoded audio information is constant.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A signal transmission apparatus for transmitting a plurality of pieces of encoded audio information encoded by the same encoding method via a digital interface to a signal reception apparatus, wherein each of the plurality of pieces of encoded audio information has a sampling frequency of F or ½×F, the apparatus comprising:

a data generating section for, based on one-frame data obtained by dividing the encoded audio information into frames, generating at least one block; and a data output section for outputting the at least one block generated by the data generating section to the digital interface, wherein:

each of the at least one block includes a body portion, and a header portion storing management information for managing data stored in the body portion;

the management information includes synchronization word information indicating a start of the block, and information indicating whether data stored in the body portion is valid;

when the encoded audio information has a sampling frequency of F, the data generating section generates one block for one-frame data of the encoded audio information, stores one-frame data of the encoded audio information in the body portion of the generated block, and stores in the header portion of the generated block the management information including information indicating that data stored in the body portion of the generated block is valid;

when the encoded audio information has a sampling frequency of ½×F, the data generating section generates a pair of blocks including a previous block and a subsequent block for one-frame data of the encoded audio information, stores one-frame data of the encoded audio information in the body portion of the generated previous block, stores in the header portion of the generated previous block the management information including information indicating that data stored in the body portion of the generated previous block is valid, and stores in the header portion of the generated subsequent block the management information including information indicating that data stored in the body portion of the generated subsequent block is invalid; and the sizes of the previous block and the subsequent block generated by the data generating section when the encoded audio information has a sampling frequency of ½×F are each equal to the size of the one block generated by the data generating section when the encoded audio information has a sampling frequency of F.

2. A signal transmission apparatus according to claim 1, wherein the information indicating whether data stored in the body portion is valid is side information indicating whether the encoded audio information is stored in the body portion, and when the side information indicates that the encoded audio information is not stored in the body portion, the side information indicates that the data stored in the body portion is invalid.

3. A signal transmission apparatus according to claim 1, wherein the data generating section stores stuffing information in the body portion in the subsequent block.

4. A signal transmission apparatus according to claim 1, wherein:

the management information further includes data type information indicating an encoding method for data stored in the body portion;

the data type information of the previous block is the same as the data type information of the block generated when the encoded audio information has a sampling frequency of F; and the data type information of the subsequent block indicates an encoding method for data stored in the body portion of the previous block irrespective of an encoding method for data stored in the body portion of the subsequent block.

5. A signal transmission apparatus for transmitting a plurality of pieces of encoded audio information encoded by the same encoding method via a digital interface to a signal reception apparatus, wherein each of the plurality of pieces of encoded audio information has a sampling frequency of F or 1/N×F, where N is a natural number greater than or equal to 2, the apparatus comprising:

a data generating section for, based on one-frame data obtained by dividing the encoded audio information into frames, generating at least one block; and a data output section for outputting the at least one block generated by the data generating section to the digital interface, wherein:

each of the at least one block includes a body portion, and a header portion storing management information for managing data stored in the body portion;

the management information includes synchronization word information indicating a start of the block, and information indicating whether data stored in the body portion is valid;

when the encoded audio information has a sampling frequency of F, the data generating section generates one block for one-frame data of the encoded audio information, stores one-frame data of the encoded audio information in the body portion of the generated block, and stores in the header portion of the generated block the management information including information indicating that data stored in the body portion of the generated block is valid;

when the encoded audio information has a sampling frequency of 1/N×F, the data generating section generates a set of N blocks for one-frame data of the encoded audio information, stores one-frame data of the encoded audio information in the body portion of a first block of the N generated blocks to be output first, stores in the header portion of the first block the management information including information indicating that data stored in the body portion of the first block is valid, and stores in the header portion of each block of the N generated blocks other than the first block the management information including information indicating that data stored in the body portion of the each block is invalid; and the sizes of the N blocks generated by the data generating section when the encoded audio information has a sampling frequency of 1/N×F are each equal to the size of the one block generated by the data generating section when the encoded audio information has a sampling frequency of F.

6. A signal transmission method for transmitting a plurality of pieces of encoded audio information encoded by the same encoding method via a digital interface to a signal reception apparatus, wherein each of the plurality of pieces of encoded audio information has a sampling frequency of F or ½×F, the method comprising the steps of;

generating at least one block based on one-frame data obtained by dividing the encoded audio information into frames; and outputting the at least one block generated by the data generating step to the digital interface, wherein:

each of the at least one block includes a body portion, and a header portion storing management information for managing data stored in the body portion;

the management information includes synchronization word information indicating a start of the block, and information indicating whether data stored in the body portion is valid;

when the encoded audio information has a sampling frequency of F, the data generating step includes the step of generating one block for one-frame data of the encoded audio information, storing one-frame data of the encoded audio information in the body portion of the generated block, and storing in the header portion of the generated block the management information including information indicating that data stored in the body portion of the generated block is valid;

when the encoded audio information has a sampling frequency of ½×F, the data generating step includes the step of generating a pair of blocks including a previous block and a subsequent block for one-frame data of the encoded audio information, stores one-frame data of the encoded audio information in the body portion of the generated previous block, storing in the header portion of the generated previous block the management information including information indicating that data stored in the body portion of the generated previous block is valid, and storing in the header portion of the generated subsequent block the management information including information indicating that data stored in the body portion of the generated subsequent block is invalid; and the sizes of the previous block and the subsequent block generated by the data generating step when the encoded audio information has a sampling frequency of ½×F are each equal to the size of the one block generated by the data generating step when the encoded audio information has a sampling frequency of F.

7. A signal transmission method according to claim 6, wherein the information indicating whether data stored in the body portion is valid is side information indicating whether the encoded audio information is stored in the body portion, and when the side information indicates that the encoded audio information is not stored in the body portion, the side information indicates that the data stored in the body portion is invalid.

8. A signal transmission method according to claim 6, wherein the data generating step stores stuffing information in the body portion in the subsequent block.

9. A signal transmission method according to claim 6, wherein:

the management information further includes data type information indicating an encoding method for data stored in the body portion;

the data type information of the previous block is the same as the data type information of the block generated when the encoded audio information has a sampling frequency of F; and the data type information of the subsequent block indicates an encoding method for data stored in the body portion of the previous block irrespective of an encoding method for data stored in the body portion of the subsequent block.

10. A signal transmission method for transmitting a plurality of pieces of encoded audio information encoded by the same encoding method via a digital interface to a signal reception apparatus, wherein each of the plurality of pieces of encoded audio information has a sampling frequency of F or 1/N×F, where N is a natural number greater than or equal to 2, the method comprising the steps of:

generating at least one block based on one-frame data obtained by dividing the encoded audio information into frames; and outputting the at least one block generated by the data generating step to the digital interface, wherein:

each of the at least one block includes a body portion, and a header portion storing management information for managing data stored in the body portion;

the management information includes synchronization word information indicating a start of the block, and information indicating whether data stored in the body portion is valid;

when the encoded audio information has a sampling frequency of F, the data generating step includes the step of generating one block for one-frame data of the encoded audio information, storing one-frame data of the encoded audio information in the body portion of the generated block, and storing in the header portion of the generated block the management information including information indicating that data stored in the body portion of the generated block is valid;

when the encoded audio information has a sampling frequency of 1/N×F, the data generating step include the step of generating a set of N blocks for one-frame data of the encoded audio information, storing one-frame data of the encoded audio information in the body portion of a first block of the N generated blocks to be output first, storing in the header portion of the first block the management information including information indicating that data stored in the body portion of the first block is valid, and storing in the header portion of each block of the N generated blocks other than the first block the management information including information indicating that data stored in the body portion of the each block is invalid; and the sizes of the N blocks generated by the data generating step when the encoded audio information has a sampling frequency of 1/N×F are each equal to the size of the one block generated by the data generating section when the encoded audio information has a sampling frequency of F.

* * * * *

UNITED STATES PATENT AND TRADEMARK OFFICE
CERTIFICATE OF CORRECTION

PATENT NO. : 6,931,371 B2
DATED : August 16, 2005
INVENTOR(S) : Masahiro Sueyoshi et al.

It is certified that error appears in the above-identified patent and that said Letters Patent is hereby corrected as shown below:

Column 24,
Line 58, "step of;" should read -- steps of: --.

Column 26,
Line 53, "section" should read -- step --.

Signed and Sealed this

Twenty-first Day of February, 2006

JON W. DUDAS
*Director of the United States Patent and Trademark Office*